(12) United States Patent
Mays et al.

(10) Patent No.: US 8,680,776 B1
(45) Date of Patent: Mar. 25, 2014

(54) LIGHTING DEVICE INCLUDING A FAST START CIRCUIT FOR REGULATING POWER SUPPLY TO A PFC CONTROLLER

(75) Inventors: Steve Mays, Madison, AL (US); Philip Walker, Manchester, TN (US)

(73) Assignee: Universal Lighting Technologies, Inc., Madison, AL (US)

( * ) Notice: Subject to any disclaimer, the term of this patent is extended or adjusted under 35 U.S.C. 154(b) by 252 days.

(21) Appl. No.: 13/332,357

(22) Filed: Dec. 20, 2011

(51) Int. Cl.
*H05B 41/16* (2006.01)

(52) U.S. Cl.
USPC ........ 315/247; 315/224; 315/185 S; 315/291; 315/307

(58) Field of Classification Search
USPC .......... 315/247, 224, 225, 246, 209 R, 185 S, 315/291, 307
See application file for complete search history.

(56) References Cited

U.S. PATENT DOCUMENTS

| | | | |
|---|---|---|---|
| 5,659,371 A | 8/1997 | Krause | |
| 6,057,721 A | 5/2000 | Nolan et al. | |
| 6,876,226 B2 | 4/2005 | Buchmann et al. | |
| 6,972,550 B2 | 12/2005 | Hong | |
| 6,989,637 B2 | 1/2006 | Chen et al. | |
| 7,589,480 B2 | 9/2009 | Greenwood et al. | |
| 2007/0241735 A1 | 10/2007 | Rabeyrin et al. | |
| 2007/0253229 A1 | 11/2007 | Dowlatabadi | |
| 2008/0297212 A1 | 12/2008 | Grasso et al. | |
| 2008/0303493 A1 | 12/2008 | Hu et al. | |
| 2010/0328972 A1 | 12/2010 | Pollak et al. | |
| 2011/0016270 A1 | 1/2011 | Yeh | |
| 2011/0075457 A1 | 3/2011 | Thrap | |
| 2011/0084552 A1 | 4/2011 | Faerevaag | |
| 2011/0116289 A1 | 5/2011 | Zong et al. | |
| 2011/0134664 A1 | 6/2011 | Berghegger | |
| 2012/0206064 A1* | 8/2012 | Archenhold | 315/297 |
| 2013/0113375 A1* | 5/2013 | Leung et al. | 315/85 |

* cited by examiner

*Primary Examiner* — Tuyet Thi Vo
(74) *Attorney, Agent, or Firm* — Waddey Patterson; Mark J. Patterson; Gary L. Montle

(57) ABSTRACT

A lighting device such as an electronic ballast or LED driver includes a power factor correction (PFC) controller responsive to input power supply signals to generate control signals, a PFC boost converter responsive to said control signals to generate a boosted output voltage, and a fast start circuit with a power supply source and an energy storage device, a magnitude of the input power supply signal corresponding to energy stored in the energy storage device. During a first mode, the fast start circuit responds to a rectified mains input to enable the power supply source and charge the energy storage device. During a second mode, the fast start circuit responds to a magnitude of the power supply signal to disable the power supply source and discharge the energy storage device. The boost converter during the second operating mode maintains controller operation while the power supply source is disabled.

20 Claims, 8 Drawing Sheets

LIGHTING DEVICE INCLUDING A FAST START CIRCUIT FOR REGULATING POWER SUPPLY TO A PFC CONTROLLER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference:
None

BACKGROUND OF THE INVENTION

The present invention relates generally to lighting devices such as electronic ballasts or LED drivers. More particularly, the present invention relates to lighting devices having a fast start circuit for rapidly starting a power factor correction controller and maintaining a power supply input voltage to the same.

A conventional lighting device 10 as represented for example in FIG. 1 may include an EMI filter 12 and a rectifier 14 coupled to receive, filter and rectify a mains AC input, respectively. The rectified mains voltage may then be provided via positive and negative DC voltage rails defining a bulk voltage (Vbulk) to a boost converter 20 of a power factor correction (PFC) circuit 16. The boost converter 20 is driven by a PFC controller 18 such as an integrated circuit (PFC IC), and as a result provides a converted voltage to an output stage of the lighting device 10. As but one example, the lighting device 10 may be an electronic ballast for powering a load such as one or more fluorescent lamps, in which case the output stage may include an inverter and associated control and protection circuitry. The lighting device 10 may alternatively be, for example, an LED driver for powering a load such as one or more LED modules or equivalent semiconductor light sources.

Marketing needs require short durations between the time when the mains AC voltage is applied to a lighting device and when the device subsequently drives up to ninety percent of an output current through the associated light source. The first step in generating the necessary output current is to develop the necessary voltage (Vcc) for starting up the PFC IC. However, conventional systems and methods for rapidly generating the PFC IC power supply (Vcc) often struggle with problems such as overheating of components, exceeding the voltage ratings of components, and properly maintaining the voltage to the PFC IC even where the primary power source for the PFC IC is otherwise inactive.

With reference to FIGS. 2-4, various topologies and methods may be described in accordance with previous efforts to address these problems.

FIG. 2 represents a simple resistor network coupled to the rectified mains voltage input to trickle current to the Vcc node (e.g., the PFC IC input terminal). One disadvantage to this approach is that this process constantly consumes power whether the primary source of current for the PFC IC is active or not. Also, because the resistor network is chosen to deliver just enough current to start the PFC IC and otherwise consume as little power as possible, this method requires a substantial amount of time to develop the voltage necessary to start the PFC IC. This further reduces the time allowed for the output current source to reach the target level, thus to some extent defeating the purpose for the circuit.

Referring now to FIG. 3, a switched resistor network coupled to a bulk voltage Vbulk drives current to a controller (such as an IC) that develops an unregulated voltage (Vdc) which is subsequently regulated (Vcc) and made available via a diode. Because the high side of the S2 reference voltage is referenced to ground, Vdc must be significantly higher than Vcc. This requires a voltage regulator Vreg capable of handling the power associated with the R_load current and the difference between Vdc and Vcc.

This method requires voltage Vdc to reach a level high enough to turn off S2. Vdc only increases when the boost converter is active, which further only occurs when Vbulk droops, which may happen as a result of, for example, loading from the Vbulk sensing networks and current limiting resistor R1. However, until Vbulk droops enough to cause the PFC IC to begin driving the boost converter, which will then supply current to the Vdc node, a large and potentially damaging current will flow through the current limiting resistor R1. Vdc will in such circumstances likely droop to a level at which point Vcc can, in turn, droop to an unsafe level.

A microcontroller or equivalent computing device may be used to turn on and off the main switch S1 controlling the current fed to Vcc. The computing device can provide hysteresis for this approach, but needs to be able to measure Vcc. This requires additional inputs to the computing device that may or may not be available. If the computing device has the required inputs and outputs, the computing device must be referenced to the same ground as the main switch S1. The primary controls of some electronic ballasts and drivers reside on an isolated section of the product with a different ground reference making this approach practically unusable.

Using this approach without hysteresis control can damage components if the computing device does not turn off the main switch S1 in time to protect the current limiting resistor R1.

Referring now to FIG. 4, in another alternative topology a second voltage sensitive switch S2 may be used to measure the rectified mains voltage Vbulk and turn off the main switch S1. Resistors R3, R4 define a voltage divider with respect to the rectified mains voltage Vbulk and are chosen to turn off the main switch S1 after the PFC IC has already begun to drive current through the boost converter.

Because this approach has no knowledge of the magnitude of the power supply Vcc, it is possible to turn off the main switch S1 before Vcc reaches a level sufficient to enable the output capacitor C2 to continue supplying current to the PFC IC and thereby maintain gate driving pulses to the primary switch of the boost converter. Because this approach lacks knowledge of Vcc, if the boost converter idles and the power supply source is inactive, Vcc can droop to an uncontrolled level. A common solution to this problem is to trickle current through a string of resistors from the rectified mains input. This will not only constantly consume power when the power supply source is active, but requires even more resistors consuming space on the printed circuit board.

BRIEF SUMMARY OF THE INVENTION

A lighting device of the present invention is provided with a fast start circuit for increasing the voltage to the PFC controller (e.g., PFC IC) quickly and safely, and further for maintaining voltage to the PFC IC even during inactive periods for the primary power supply source.

One aspect of a fast start circuit of the present invention is to employ hysteresis to keep the power supply voltage Vcc to the PFC IC within the operating range of the IC without exceeding a maximum rated voltage of the IC and further without drooping to a point at which the PFC IC would otherwise turn off.

In another aspect, the fast start circuit is self-contained in that it does not require an external computing device such as a microcontroller for hysteretic control of the main switch driving current into the Vcc node.

In an embodiment, a lighting device such as an electronic ballast or LED driver in accordance with the present invention includes a power factor correction (PFC) controller responsive to an input power supply signal to generate control signals, a PFC boost converter responsive to said control signals to generate a boosted output voltage, and a fast start circuit with a power supply source and an energy storage device, a magnitude of the input power supply signal corresponding to energy stored in the energy storage device. During a first mode, the fast start circuit responds to a rectified mains input to enable the power supply source and charge the energy storage device. During a second mode, the fast start circuit responds to a magnitude of the power supply signal to disable the power supply source and discharge the energy storage device. The boost converter during the second operating mode assures controller operation is maintained while the power supply source is disabled.

In another embodiment, a lighting device in accordance with the present invention includes a PFC controller responsive to an input power supply signal having at least a minimum voltage magnitude, and a fast start circuit. The fast start circuit includes a power supply source, an energy storage device, and first and second switching circuits. A magnitude of the input power supply signal corresponds to energy stored in the energy storage device. The first switching circuit activates the power supply source (charging the energy storage device) in a first switch state and deactivates the power supply source (discharging the energy storage device) in a second switch state. The second switching circuit is turned on and off to control the first switching circuit between the first and second switch states based on the magnitude of the power supply signal rising to a first threshold and falling to a second threshold less than the first threshold, respectively.

In yet another embodiment, a method is provided in accordance with the present invention for rapidly providing and maintaining an input power supply signal for a power factor correction circuit controller for a lighting device. A rectified mains voltage is first received at a fast start circuit comprising a power supply source, an energy storage device and first and second switching elements. Then the first switching element is turned on, further activating the power supply source to rapidly charge the energy storage device, with a magnitude of the input power supply signal to the controller corresponding to energy stored in the energy storage device. Next, the second switching element is turned on when the magnitude of the input power supply signal reaches or exceeds a first threshold voltage, further causing the first switching element to be turned off and deactivating the power supply source. The second switching element is only turned off when the magnitude of the input power supply signal decreases to or below a second threshold voltage, further causing the first switching element to be turned on again and activating the power supply source.

DETAILED DESCRIPTION OF THE INVENTION

Figure 1:
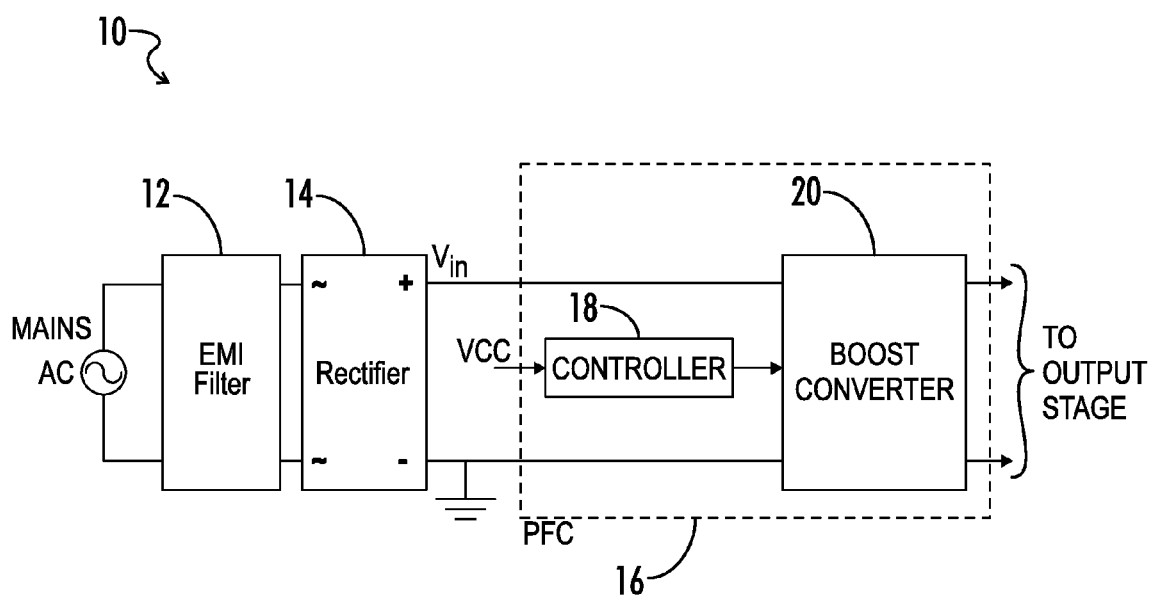
FIG. 1 is a block diagram representing a portion of a conventional lighting device.
Figure 2:
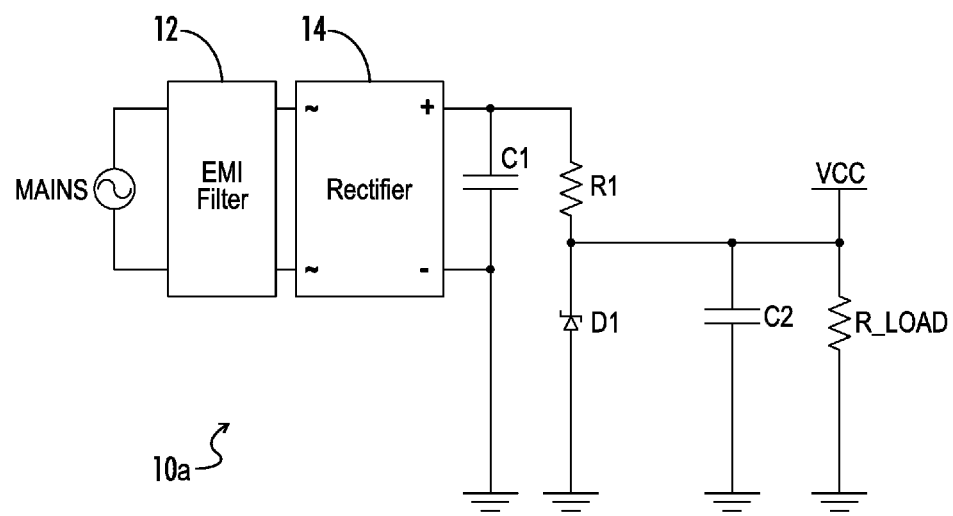
FIG. 2 is a circuit block diagram representing another topology for a conventional lighting device.
Figure 3:
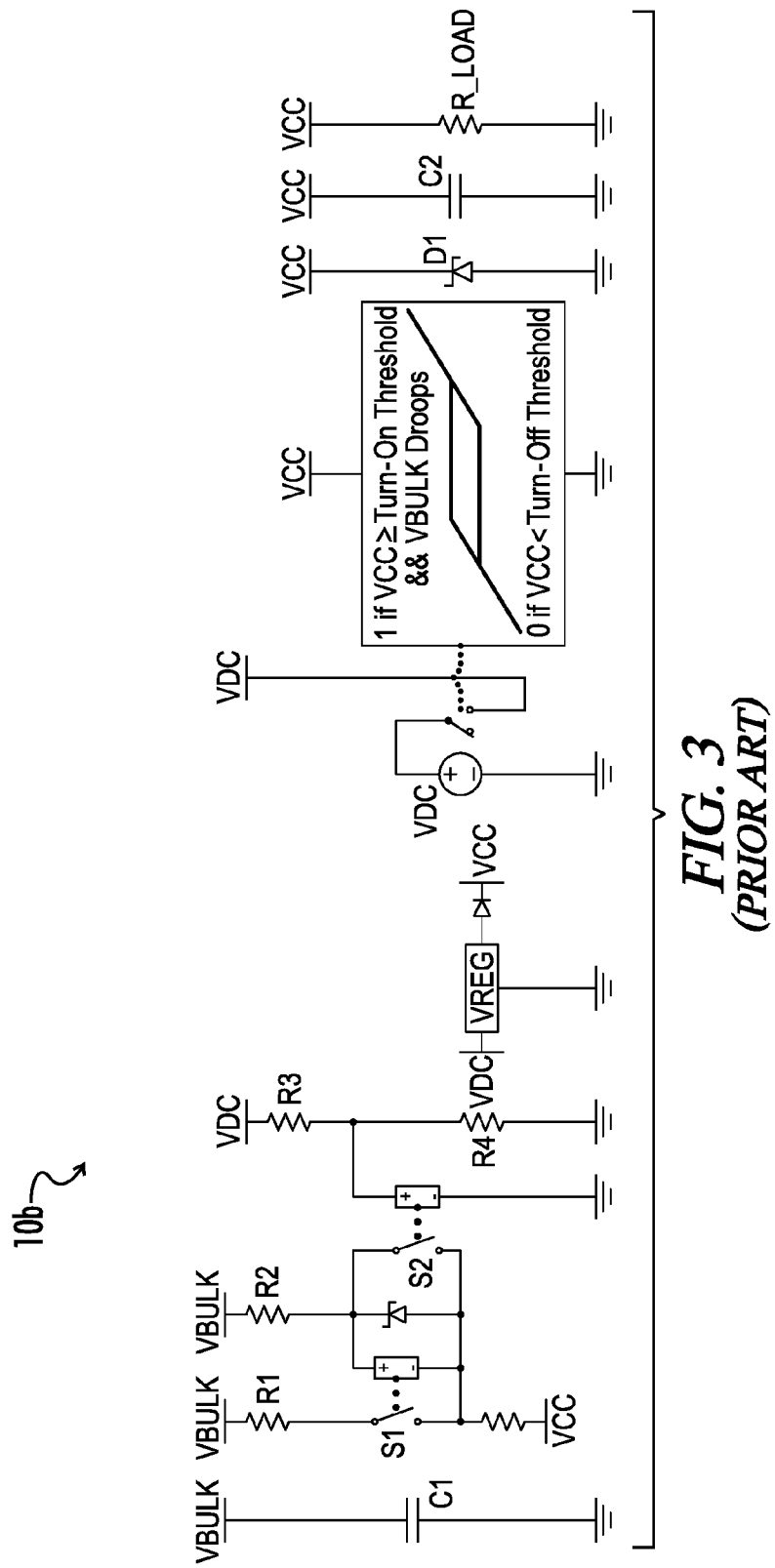
FIG. 3 is a circuit block diagram representing another topology for a conventional lighting device.
Figure 4:
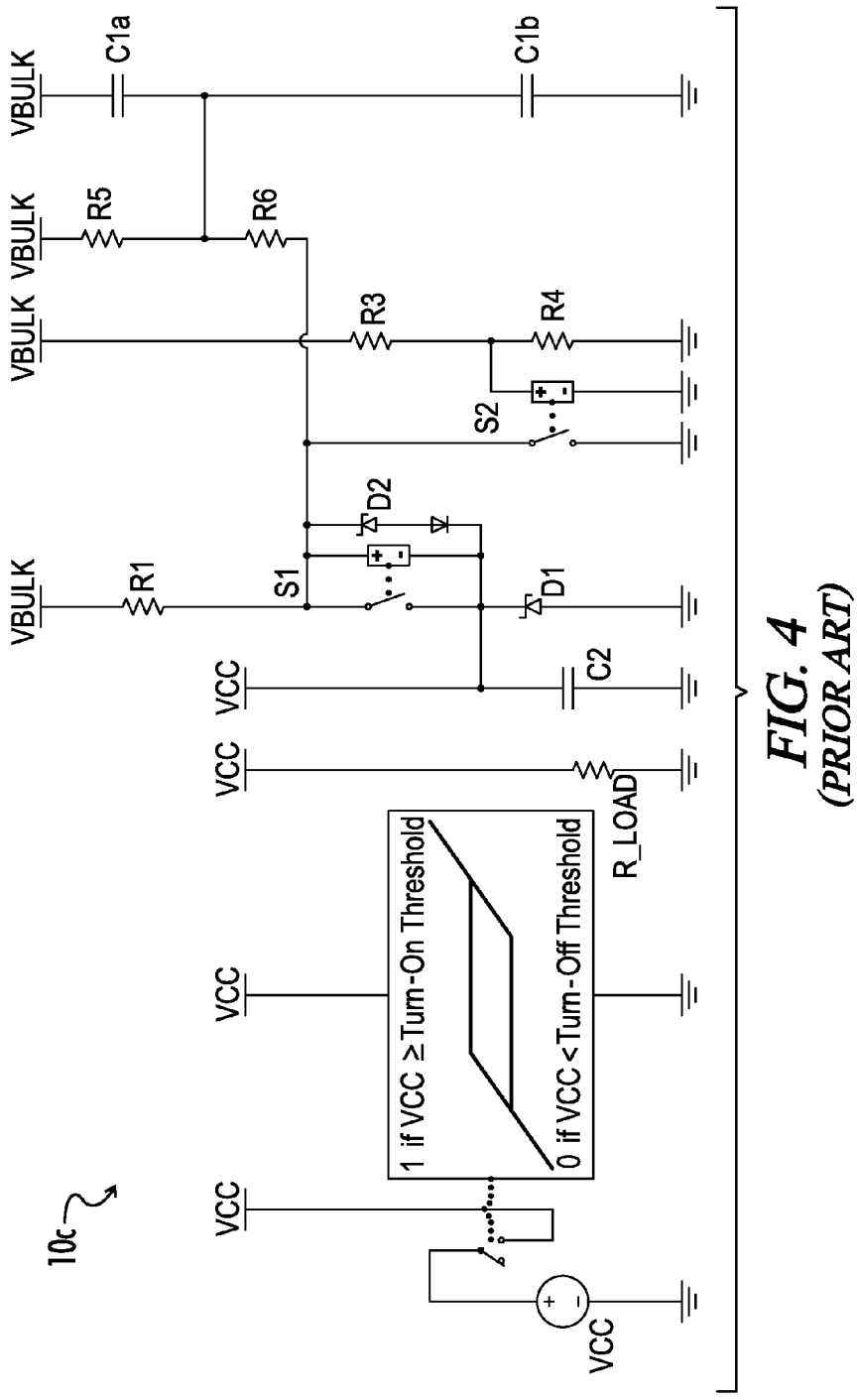
FIG. 4 is a circuit block diagram representing another topology for a conventional lighting device.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" as used herein may include any meanings as may be understood by those of ordinary skill in the art, including at least an electric or magnetic representation of current, voltage, charge, temperature, data or a state of one or more memory locations as expressed on one or more transmission mediums, and generally capable of being transmitted, received, stored, compared, combined or otherwise manipulated in any equivalent manner.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Referring generally to FIGS. 5-9, various embodiments of a lighting device 100 may be described in accordance with the present invention having a fast start circuit 102. Where the various figures may describe embodiments sharing various common elements and features with other embodiments, similar elements and features are given the same reference numerals and redundant description thereof may be omitted below.

Figure 5:
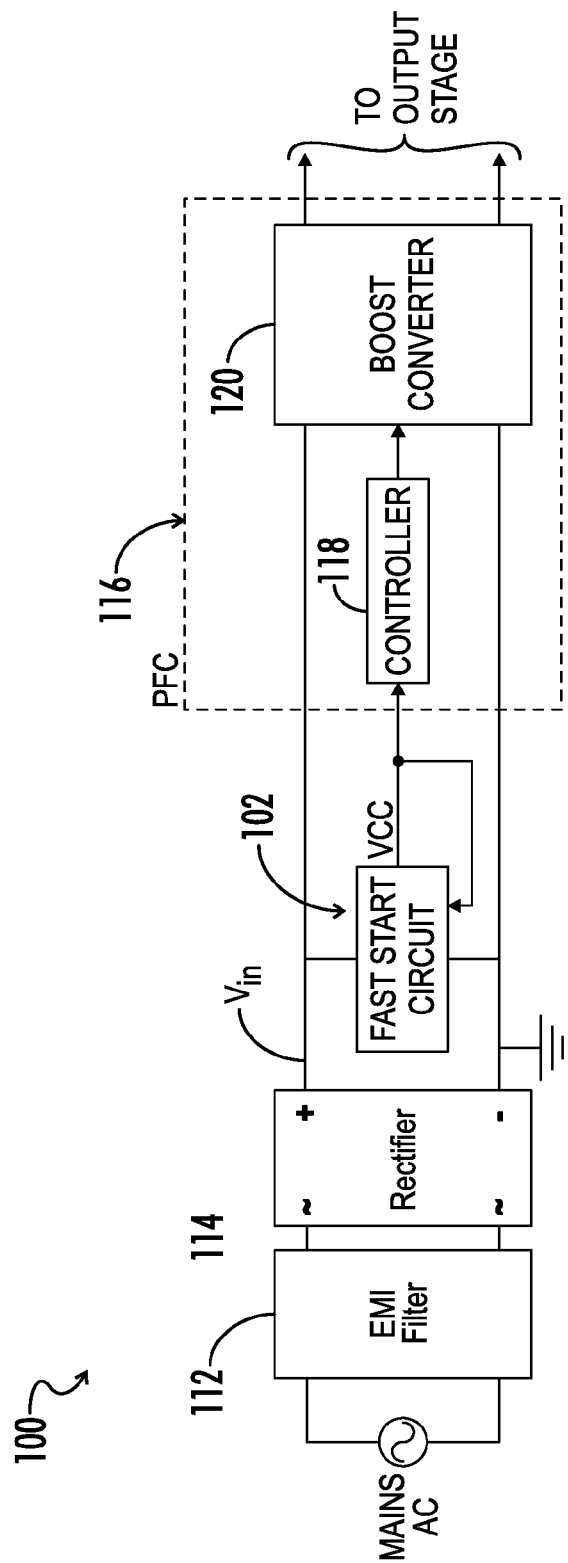
FIG. 5 is a block diagram representing a simplified lighting device in accordance with various embodiments of the present invention.

Referring first to FIG. 5, a lighting device 100 in various embodiments may include one or more conventional components such as for example an EMI filter 112 coupled to a mains AC power source, a rectifier 114 for rectifying the mains AC input into an input voltage (Vin) and a power factor correction (PFC) circuit 116 further including a boost converter 120 and a controller 118 (PFC IC) that creates a bulk voltage (Vbulk). What is added to the lighting device 100 in accordance with the present invention is a fast start circuit 102 which is responsive to the presence of the rectified mains voltage Vbulk to generate power supply Vcc to the PFC controller 118 and further to regulate the power supply Vcc within a given range associated with the controller 118. The fast start circuit 102 accomplishes this by enabling and disabling a power supply source based on a magnitude of the power supply voltage Vcc falling to or rising above predetermined threshold levels.

Figure 6:
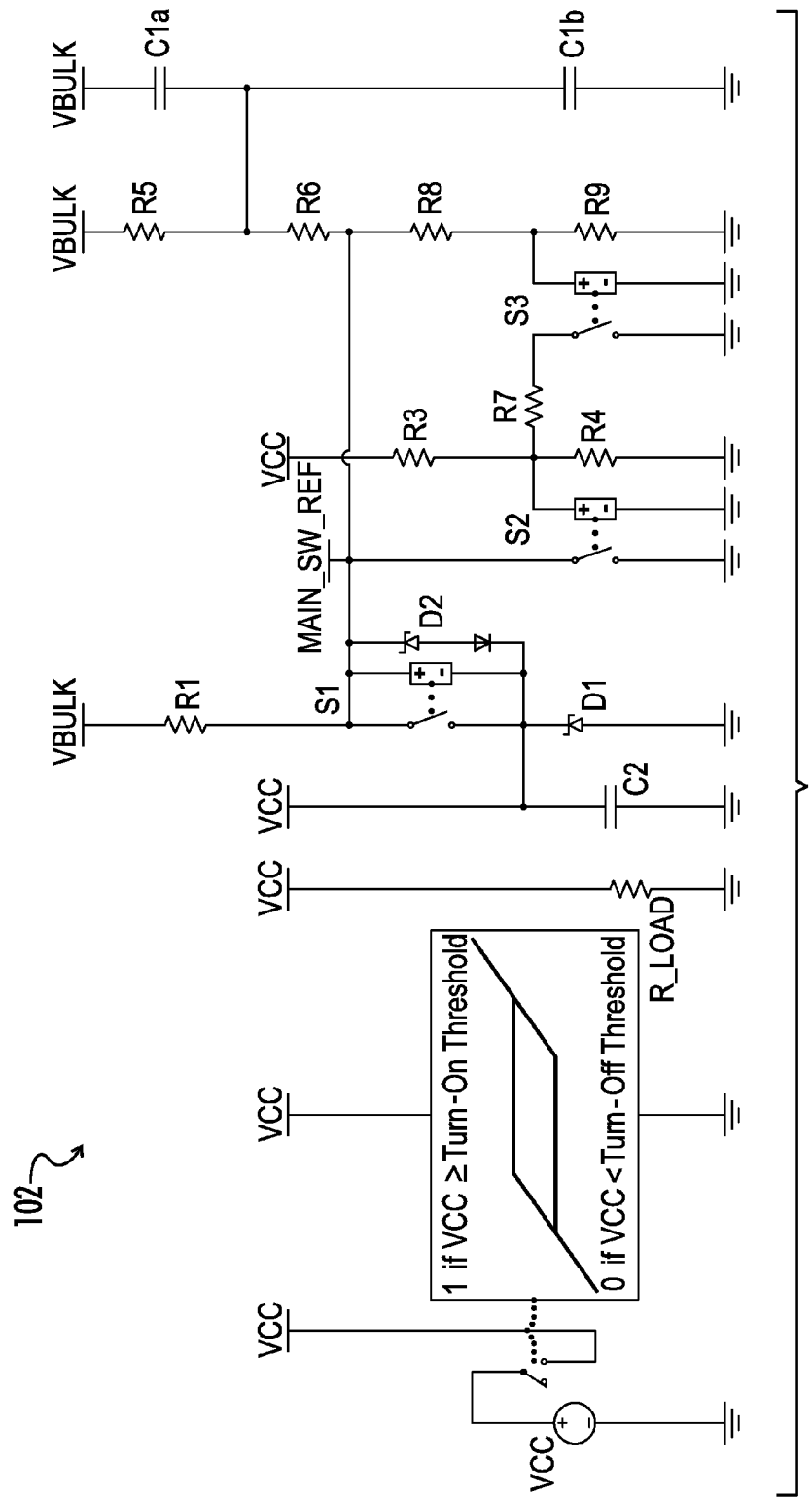
FIG. 6 is a circuit block diagram representing an embodiment of the fast start circuit for a lighting device of the present invention.

Referring to FIG. 6, in a particular embodiment the fast start circuit 102 may include a first switching circuit defined by, for example, a first switching element S1, a biasing diode D2, and a current limiting resistor R1. A second switching circuit is defined by, for example, a second switching element S2 and resistors R3, R4 coupled between a Vcc feedback node and ground. A third switching circuit is defined by for example a third switching element S3 and resistors R7, R8, R9. The circuit designations are not intended as limiting but are rather illustrative in nature with regards to the functions to be performed by the various circuit blocks. While the design is represented in the figures and generally described herein with respect to generic voltage controlled switches which are turned on and off to perform the recited functions, in other embodiments the fast start circuit could be implemented using for example IC voltage comparators, operational amplifiers, IGBT technology, MOSFET technology, or BJT technology, including Darlington connected transistors. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

In various embodiments the circuit blocks may be referred to as being controlled between first and second switch states and interchangeably or alternatively as including switches and associated circuitry controlling the switches to be turned on and turned off.

In embodiments where, for example, BJT technology is utilized, the switching elements may be temperature sensitive such that the base-emitter voltage required to conduct current from collector-emitter decreases as the junction temperature of the BJT increases, which can influence the gate voltage required to turn on and off the switching elements. Thermally sensitive conduction devices such as for example thermistors may accordingly be provided (not shown in the figures) to adjust how the BJTs are biased.

The fast start circuit 102 as shown further includes a power supply source VCC and an energy storage device (for example the output capacitor C2). A magnitude of the power supply signal Vcc generally corresponds to the charge stored in the energy storage device at a given time, and the fast start circuit is configured to enable or disable the power supply source VCC and further charge or discharge the energy storage device, respectively, based on the magnitude of the power supply signal Vcc.

An exemplary operation of the fast start circuit 102 may now be described as follows, still with reference to FIG. 6. When the mains input voltage is first applied, a charge is stored in bulk capacitors C1a, C1b equal to the rectified mains voltage. The main switch (first switching element S1) is open and blocks any significant current from the current limiting resistor R1, and the power supply source VCC is inactive. Current trickles through the balancing resistors R5, R6 and the biasing diode D2 into the output capacitor C2. A finite voltage then develops across the diode D2 to turn on the main switch S1 and thereby drive a significant current through the resistor R1 into the output capacitor C2.

Resistors R3, R4 collectively define a first voltage divider which supplies a bias voltage Vbias for the reset switch (second switching element S2). Resistors R8, R9 collectively supply a bias voltage for the third switching element S3, and their values may generally be chosen to turn on the third switching element S3 before the second switching element S2 is allowed to turn on. When the third switching element S3 is turned on, the resistor R7 is placed across the first voltage divider to define a second voltage divider and further change the bias point for the second switching element S2. The voltage across the output capacitor C2 increases rapidly due to the large current flowing into it from the current limiting resistor R1 until the voltage at the reference for the second switching element S2 (Vbias, as further expressed in Equation 1 below) reaches the trigger point for the second switching element S2 (i.e., a first voltage threshold for the second switching element S2).

$$V\text{bias}=Vcc*(R7//R4)/((R7//R4)+R3) \quad \text{Equation 1}$$

The values for the second voltage divider R3, R4, R7 may preferably be chosen such that the second switching element S2 may only be turned on after the power supply voltage Vcc has exceeded the turn-on threshold for the PFC controller 118. At that time, the PFC controller 118 starts driving current through the boost converter. When the power supply Vcc reaches the voltage magnitude necessary (in conjunction with the second voltage divider R3, R4, R7) to turn on the second switching element S2, the reference node (labeled Main_SW_Ref in FIG. 6) is pulled to zero volts, turning off the first switching element 51 and the third switching element S3, and blocking the current through the resistor R1. At this point the boost converter may be presumed to be supplying current to the Vcc node, thereby maintaining Vcc to the PFC controller 118 without the need for R1 current.

When the third switching element S3 is turned off, the resistor R7 is removed from the resistive network R3, R4, thereby increasing the voltage at the voltage reference of the second switching element S2. With the reference node Main_SW_Ref pulled to zero volts the balancing resistors R5, R6 are connected to, and further help to balance the voltage across, the bulk capacitors C1a, C1b.

Figure 9:
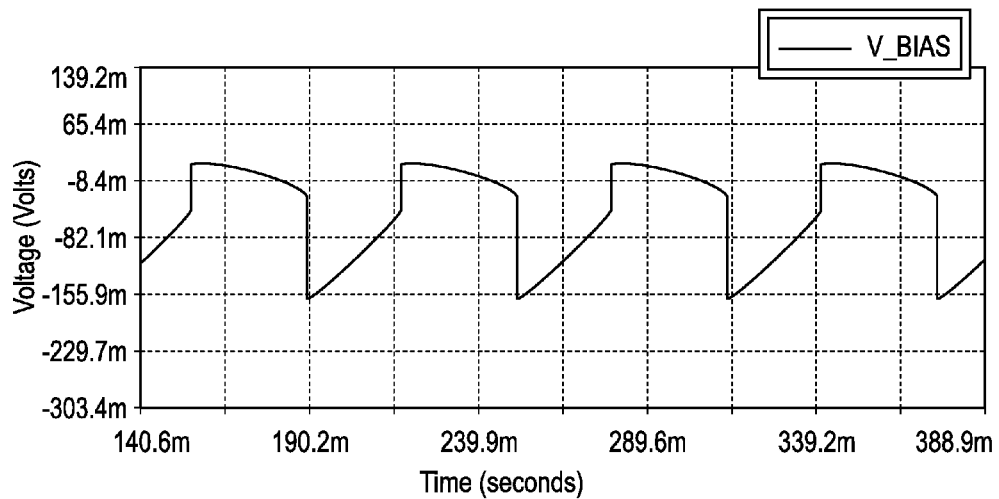
FIG. 9 is a graphical diagram representing bias voltage characteristics over time in accordance with various embodiments of a fast start circuit of the present invention.

The voltage necessary to return the second switching element S2 to the off state from the on state (i.e., a second voltage threshold for the second switching element S2) is expressed by Equation 2 below, and is less than the voltage required to turn on the second switching element S2 from the off state. The relationship between the first and second threshold voltages for the power supply Vcc as needed to change the state of the second switching element S2 is by definition hysteretic. See also for example the graphical diagram in FIG. 9, representing the reference voltage Vbias for the second switching element S2 with respect to time (in seconds), wherein the first and second threshold voltages can be set in accordance with the changing Vbias.

$$V\text{bias}=Vcc*R4/(R3+R4) \quad \text{Equation 2}$$

When the power supply source VCC is inactive, the various switching circuits will oscillate between the turn on voltage and turn off voltage (first and second voltage thresholds, respectively) of the second switching element S2. The duty cycle of the oscillation is based on the time required to charge the output capacitor C2 from the turn off voltage of the second switching element S2 to the turn on voltage of the second switching element S2, and the time required to discharge the output capacitor C2 from the turn on voltage of the second switching element S2 to the turn off voltage of the second switching element S2. The time required to discharge the output capacitor C2 from the turn on voltage of the second switching element S2 to the turn off voltage of the second switching element S2 is substantially constant, and presumably will not affect the current limiting resistor R1. The time required to charge the output capacitor C2 from the turn off voltage of the second switching element S2 to the turn on voltage of the second switching element S2 is based on the value of the rectified mains voltage Vbulk, whether developed by the boost converter or by rectified mains.

Figure 8:
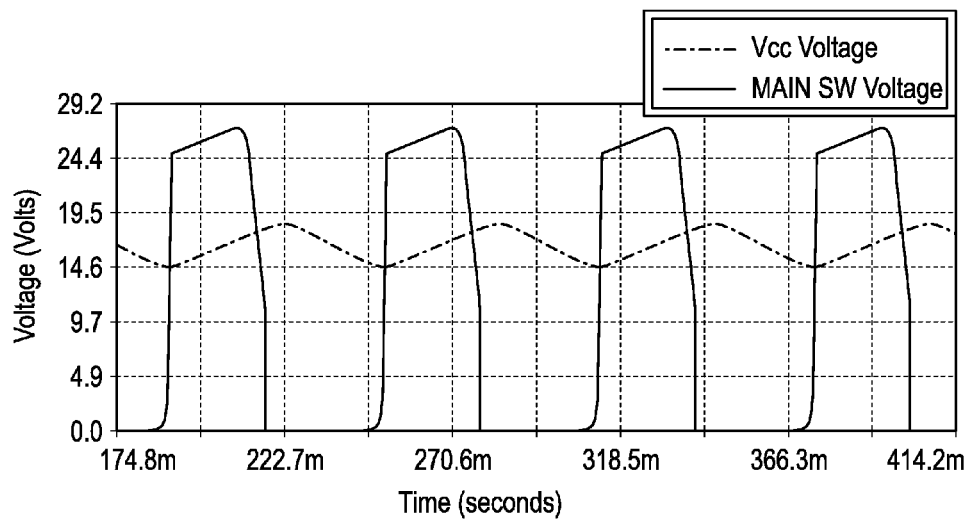
FIG. 8 is a graphical diagram representing an exemplary power supply voltage Vcc to main switch S1 voltage characteristics over time and in accordance with various embodiments of a fast start circuit of the present invention.

Despite the magnitude of Vbulk, the energy transferred to the output capacitor C2 during the charge cycle is substantially constant and the current limiting resistor R1 can be optimally sized to ensure it is not harmed regardless of how long the fast start circuitry oscillates. See for example the graphical diagram in FIG. 8, representing the power supply Vcc over time in accordance with the substantially constant charge cycle, as well as the voltage Vs1 on the first switching element S1, with respect to time (in seconds).

Various advantages may be provided to a lighting device implementing the fast start circuit of the present invention. The circuit is generally autonomous in that is does not require a computing device (which may or may not be available) for hysteretic control but rather relies on discrete circuitry to perform the same functions.

The power supply Vcc may be maintained within a PFC IC input range under the voltage necessary to damage the PFC IC and above the voltage at which the PFC IC will shut down. Vcc regulation may further be provided over a very wide range of Vbulk, including for example lower than one half of Vbulk. Because Vbulk can supply power over a wide range of magnitudes and for long periods of time, a value of the energy storage device (e.g., output capacitor C2) can be minimal.

Further, the cost of the fast start circuit topology substantially corresponds with that of the first switching element S1. Because the current through the resistor R1 is relatively small in comparison with the current handling capability of the various switching elements for the desired voltage range, the switching elements can be very inexpensively provided.

In alternative embodiments, the power supply source VCC as represented in FIG. 6 could be for example the current source output of a charge pump off a rectangle wave generator, or a ground referenced winding off a power magnetic driven into a zener diode to develop a voltage source. The power supply source VCC could also be the full wave or half wave rectified voltage from a winding of a power magnetic.

Figure 7:
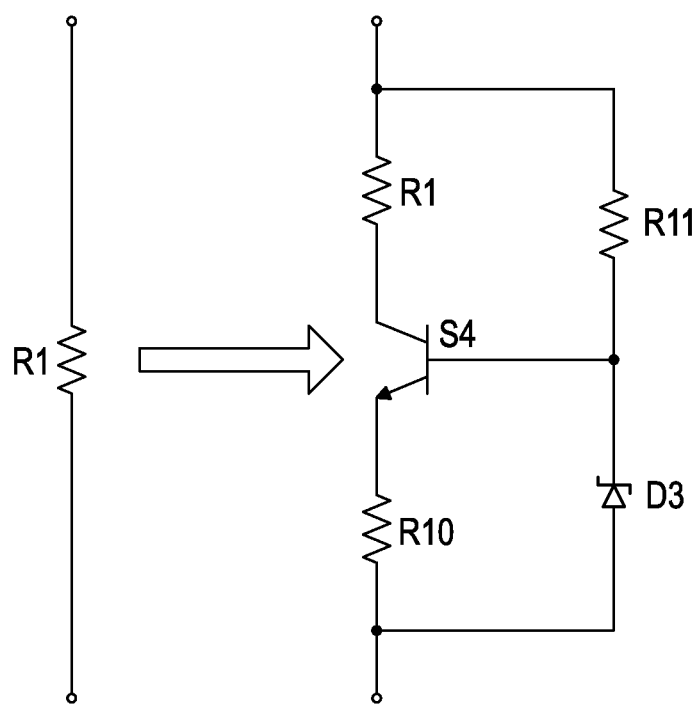
FIG. 7 is a circuit schematic representing an alternative circuit within the scope of the fast start circuit of FIG. 6.

Referring to FIG. 7, in an embodiment the current limiting resistor R1 could be replaced with an active current source that would be disabled (turned off) by the first switching element S1. A bias reference circuit (resistor R11 and diode D3) as represented in FIG. 7 could alternatively be replaced with for example a voltage source built from a second NPN transistor. Resistor R1 as shown in the current source can be set to zero ohms, or may be removed completely.

In various embodiments, the IC developing the gating signals to generate the charge pump for the power supply source VCC does not have to be a PFC IC. The IC developing the gating signals could instead be any pulse generating IC, such as for example a ballast driver IC, a PWM IC, or a microcontroller.

The previous detailed description has been provided for the purposes of illustration and description. Thus, although there have been described particular embodiments of the present invention of a new and useful "Lighting Device Including Fast Start Circuit for Regulating Power Supply to a PFC Controller," it is not intended that such references be construed as limitations upon the scope of this invention except as set forth in the following claims.

What is claimed is:

1. A lighting device comprising:
   a power factor correction circuit further comprising a controller responsive to an input power supply signal to generate control signals and a boost converter responsive to said control signals to generate a boosted output voltage;
   a fast start circuit comprising a power supply source and an energy storage device, a magnitude of the input power supply signal corresponding to energy stored in the energy storage device;
   wherein the fast start circuit is responsive to a rectified mains input voltage during a first operating mode to enable the power supply source and charge the energy storage device;
   the fast start circuit is further responsive to a magnitude of the power supply signal during a second operating mode to disable the power supply source and discharge the energy storage device; and
   the boost converter is effective during the second operating mode to maintain controller operation while the power supply source is disabled.

2. The lighting device of claim 1, wherein the fast start circuit is effective in response to a first magnitude of the power supply signal to initiate the second operating mode, and the fast start circuit is further effective in response to a second magnitude of the power supply signal to return to the first operating mode.

3. The lighting device of claim 1, wherein:
   the fast start circuit is further comprising first and second switching circuits;
   the first switching circuit is effective to charge and discharge the energy storage device when controlled to be turned on and off, respectively, by the second switching circuit; and
   the second switching circuit is effective to turn off the first switching circuit when the magnitude of the power supply signal rises to a first threshold and to turn on the first switching circuit when the magnitude of the power supply signal falls to a second threshold less than the first threshold.

4. The lighting device of claim 3 further comprising:
   the second switching circuit comprises a switching element and a resistive network defining a first voltage divider effective to provide a first voltage-divided magnitude of the power supply signal to the gate electrode of the switching element; and
   the fast start circuit further comprises a third switching circuit having a switching element and a resistor, the resistor coupled to the resistive network of the second switching circuit when the third switching circuit is turned on and removed from the resistive network of the second switching circuit when the third switching circuit is turned off, the resistor coupled to the resistive network collectively defining a second voltage divider effective to provide a second voltage-divided magnitude of the power supply signal to the gate electrode of the switching element.

5. The lighting device of claim 4, wherein a gate electrode threshold voltage for the switching element of the second switching circuit in conjunction with the first voltage divider defining the first threshold for the magnitude of the power supply signal, and the gate electrode threshold voltage for the switching element of the second switching circuit in conjunction with the second voltage divider defining the second threshold for the magnitude of the power supply signal.

6. The lighting device of claim 4, the second switching circuit further comprising a temperature sensitive conduction device associated with the switching element.

7. The lighting device of claim 1, the power supply source comprising a current source output of a charge pump off a rectangle wave generator.

8. The lighting device of claim 1, the power supply source comprising a voltage source generated by a ground referenced winding off a power magnetic being driven into a zener diode.

9. A lighting device comprising:
a power factor correction circuit having a controller responsive to an input power supply signal having at least a minimum voltage magnitude; and
a fast start circuit comprising
a power supply source,
an energy storage device, a magnitude of the input power supply signal corresponding to energy stored in the energy storage device,
a first switching circuit effective to activate the power supply source to charge the energy storage device in a first switch state and to deactivate the power supply source and discharge the energy storage device in a second switch state, and
a second switching circuit effective to control the first switching circuit between the first and second switch states based on the magnitude of the power supply signal rising to a first threshold and falling to a second threshold less than the first threshold, respectively.

10. The lighting device of claim 9, wherein:
the second switching circuit comprises a switching element and a resistive network defining a first voltage divider effective to provide a first voltage-divided magnitude of the power supply signal to the gate electrode of the switching element; and
the fast start circuit further comprises a third switching circuit having a switching element and a resistor, the resistor coupled to the resistive network of the second switching circuit when the third switching circuit is turned on and removed from the resistive network of the second switching circuit when the third switching circuit is turned off, the resistor coupled to the resistive network collectively defining a second voltage divider effective to provide a second voltage-divided magnitude of the power supply signal to the gate electrode of the switching element.

11. The lighting device of claim 10, wherein a gate electrode threshold voltage for the switching element of the second switching circuit in conjunction with the first voltage divider defines the first threshold for the magnitude of the power supply signal, and the gate electrode threshold voltage for the switching element of the second switching circuit in conjunction with the second voltage divider defines the second threshold for the magnitude of the power supply signal.

12. The lighting device of claim 10, the second switching circuit further comprising a temperature sensitive conduction device associated with the switching element.

13. The lighting device of claim 9, the power supply source comprising a current source output of a charge pump off a rectangle wave generator.

14. The lighting device of claim 9, the power supply source comprising a voltage source generated by a ground referenced winding off a power magnetic being driven into a zener diode.

15. A method of providing and maintaining an input power supply signal for a power factor correction circuit controller for a lighting device, the method comprising:
receiving a rectified mains voltage at a fast start circuit comprising a power supply source, an energy storage device and first and second switching elements;
turning on the first switching element, further activating the power supply source to rapidly charge the energy storage device, a magnitude of the input power supply signal to the controller corresponding to energy stored in the energy storage device;
turning on the second switching element when the magnitude of the input power supply signal reaches or exceeds a first threshold voltage, further causing the first switching element to be turned off and deactivating the power supply source; and
turning off the second switching element when the magnitude of the input power supply signal decreases to or below a second threshold voltage, further causing the first switching element to be turned on again and activating the power supply source.

16. The method of claim 15, further comprising a step of providing a resistive network coupled to the gate electrode of the second switching element, the resistive network defining a first voltage divider, wherein the first threshold voltage for the input power supply signal in conjunction with the first voltage divider provides a voltage to the gate electrode equal to the turn on threshold of the second switching element.

17. The method of claim 16, the step of providing the resistive network defining the first voltage divider further comprising providing a plurality of resistors having values selected such that the first threshold voltage for the input power supply signal to the controller is greater than a turn on voltage threshold for the controller but less than a rated voltage for the controller.

18. The method of claim 16, the fast start circuit further comprising a third switching element and an associated resistor, the method further comprising the steps of:
coupling the resistor associated with the third switching element to the resistive network when the third switching circuit is turned on; and
removing said resistor from said resistive network when the third switching circuit is turned off,
the resistor when coupled to the resistive network collectively defining a second voltage divider effective to provide a second voltage-divided magnitude of the power supply signal to the gate electrode of the switching element.

19. The method of claim 18, wherein the second threshold voltage for the input power supply signal in conjunction with the second voltage divider provides a voltage to the gate electrode equal to the turn off threshold of the second switching element.

20. The method of claim 19, the resistor associated with the third switching element having a value selected such that the second threshold voltage for the input power supply signal to the controller is sufficient to maintain controller operation.

* * * * *